(12) United States Patent
Yang et al.

(10) Patent No.: US 12,015,679 B2
(45) Date of Patent: Jun. 18, 2024

(54) METHODS AND APPARATUSES FOR NETWORK FUNCTION DISCOVERY

(71) Applicant: Telefonaktiebolaget LM Ericsson (publ), Stockholm (SE)

(72) Inventors: Yong Yang, Kållered (SE); Yunjie Lu, Shanghai (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/636,798

(22) PCT Filed: Aug. 6, 2020

(86) PCT No.: PCT/EP2020/072162
§ 371 (c)(1),
(2) Date: Feb. 18, 2022

(87) PCT Pub. No.: WO2021/032501
PCT Pub. Date: Feb. 25, 2021

(65) Prior Publication Data
US 2023/0179669 A1    Jun. 8, 2023

(30) Foreign Application Priority Data
Aug. 21, 2019 (WO) ............... PCT/CN2019/101794

(51) Int. Cl.
*H04L 67/51* (2022.01)
(52) U.S. Cl.
CPC .................. *H04L 67/51* (2022.05)

(58) Field of Classification Search
CPC ....... H04L 67/51; H04L 41/122; H04L 41/40; H04L 67/02; H04L 43/028; H04L 43/0864; H04L 43/20; H04W 8/00
See application file for complete search history.

(56) References Cited

U.S. PATENT DOCUMENTS

| 10,833,938 | B1* | 11/2020 | Rajput ................ H04L 67/1095 |
| 2018/0227871 | A1* | 8/2018 | Singh .................... H04W 48/18 |
| 2022/0174471 | A1* | 6/2022 | Farooq ................. H04W 8/005 |

FOREIGN PATENT DOCUMENTS

| CN | 109429295 A | 3/2019 |
| CN | 110048987 A | 7/2019 |

(Continued)

OTHER PUBLICATIONS

Orange, "Missing Requester-snssai query parameter", 3GPP TSG-CT4 Meeting #90, Xi'an, China, Apr. 8-12, 2019, C4-191257, XP051699250 (7 pages total). (Year: 2019).*

(Continued)

*Primary Examiner* — Thu V Nguyen
*Assistant Examiner* — Ranjan Pant
(74) *Attorney, Agent, or Firm* — Rothwell, Figg, Ernst & Manbeck, P.C.

(57) ABSTRACT

A network entity generates a discovery request and transmit the discovery request to a network repository entity, NRE, wherein, advantageously, the discovery request includes a set of query parameters, the set of query parameters comprising a set of candidate network entity identifiers (IDs)

(Continued)

comprising at least a first candidate network entity ID (e.g., an1-SMF instance ID), wherein each candidate network entity ID included in the set of candidate network entity IDs identifies a candidate network entity.

18 Claims, 8 Drawing Sheets

(56) References Cited

FOREIGN PATENT DOCUMENTS

| | | | | |
|---|---|---|---|---|
| CN | 110049503 A | | 7/2019 | |
| CN | 110121194 A | | 8/2019 | |
| CN | 111263409 A | * | 6/2020 | ......... H04L 12/2876 |
| CN | 114039874 A | * | 2/2022 | |
| EP | 3 358 887 A1 | | 8/2018 | |
| WO | 2019/134754 A1 | | 7/2019 | |
| WO | WO-2020030291 A1 | * | 2/2020 | ......... H04L 41/0813 |

OTHER PUBLICATIONS

3rd Generation Partnership Project: Technical Specification 3GPP TS 29.510, V16.1.1, 2019, 150 pages (Year: 2019).*

International Search Report and Written Opinion dated Oct. 13, 2020 in International Application No. PCT/EP2020/072162 (11 pages total).

Orange, "Missing Requester-snssai query parameter", 3GPP TSG-CT4 Meeting #90, Xi'an, China, Apr. 8-12, 2019, C4-191257, XP051699250 (7 pages total).

ETSI TS 129 510 V15.1.0, Oct. 2018, Technical Specification, 5G; 5G System; Network function repository services; Stage 3 (3GPP TS 29.510 version 15.1.0 Release 15) (87 pages total).

3GPP TS 23.502 V16.1.0, Jun. 2019, 3rd Generation Partnership Project; Technical Specification Group Services and System Aspects; Procedures for the 5G System; Stage 2 (Release 16) (500 pages total).

3GPP TS 29.510 V16.0.0, Jun. 2019, 3rd Generation Partnership Project; Technical Specification Group Core Network and Terminals; 5G System; Network Function Repository Services; Stage 3 (Release 16) (135 pages total).

3GPP TS 29.518 V16.0.0, Jun. 2019, 3rd Generation Partnership Project; Technical Specification Group Core Network and Terminals; 5G System; Access and Mobility Management Services; Stage 3 (Release 16) (199 pages total).

International Preliminary Report on Patentability and Written Opinion dated Nov. 23, 2021 in International Application No. PCT/EP2020/072162 (20 pages total).

* cited by examiner

METHODS AND APPARATUSES FOR NETWORK FUNCTION DISCOVERY

CROSS-REFERENCE TO RELATED APPLICATIONS

This application is a 35 U.S.C. § 371 National Stage of International Patent Application No. PCT/EP2020/072162, filed Aug. 6, 2020, which claims priority to International Patent Application No. PCT/CN2019/101794, filed on Aug. 21, 2019. The above identified applications are incorporated by reference.

TECHNICAL FIELD

Disclosed are embodiments related to network function (NF) discovery.

BACKGROUND

FIG. 1 illustrates a reference point representation of an exemplifying wireless communication system 100 represented as a 5G network architecture comprising an Access Network (AN) (e.g., a Radio AN (R(AN)) and a Core network (CN) comprising network entities in the form of Network Functions (NFs). Typically, the AN comprises base stations, e.g. such as evolved Node Bs (eNBs) or 5G base stations (gNBs) or similar. As shown in FIG. 1, User Equipments (UEs) connect to an AN as well as an Access and Mobility Management Function (AMF). As further shown in FIG. 1, the 5G CN NFs include: a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF).

The reference point representations of the 5G network architecture are used to develop detailed call flows in the normative standardization. The N1 reference point is defined to carry signaling between UE and AMF. The N2 and N3 reference points are defined to carry signaling between R(AN) and AMF and between R(AN) and UPF respectively. The N11 reference point is defined to carry signaling between AMF and SMF. The N4 reference point is defined to carry signaling between SMF and UPF. The N9 reference point is defined to carry signaling between different UPFs and the N14 reference point is defined to carry signaling between different AMFs. The reference points N15 and N7 are defined to carry signaling between PCF and AMF and SMF respectively. The N12 reference point is defined to carry signaling between AMF and AUSF. The N8 and N10 reference points are defined to carry signaling between UDM and AMF and SMF respectively. The N13 reference point is defined to carry signaling between AUSF and UDM. The N22 reference point is defined to carry signaling between NSSF and AMF.

The 5G core network aims at separating user plane and control plane. The user plane carries user traffic (e.g. user data) while the control plane carries signaling in the network. In FIG. 1, the UPF is in the user plane while the other NFs, i.e., AMF, SMF, PCF, AF, AUSF, and UDM, are in the control plane. Separating the user plane and the control plane allows the resources in each plane to be scaled independently. It also allows UPFs to be deployed separately from control plane functions in a distributed fashion. For example, an UPF may be deployed very close to UEs to shorten the Round Trip Time (RTT) between UEs and data network for some applications requiring low latency.

The NFs in the 5G core network architecture are independent modularized functions, which allows independent evolution and scaling. Modularized function design enables the 5G core network to support various services in a flexible manner.

Each NF in the core network interacts with another NF directly, but it is possible to use intermediate functions to route messages from one NF to another NF.

FIG. 2 illustrates an exemplifying wireless communication system 200 represented as a 5G network architecture that uses service-based interfaces (SBIs) between the NFs in the control plane, instead of the point-to-point reference points/interfaces used in the 5G network architecture of FIG. 1. The NFs described above with reference to FIG. 1 correspond to the NFs shown in FIG. 2. The service(s) etc. that an NF provides to other authorized NFs can be exposed to the authorized NFs through an SBI. In FIG. 2 the SBIs are indicated by the letter "N" followed by the name of the NF, e.g. Namf for the SBI of the AMF and Nsmf for the SBI of the SMF etc. The Network Exposure Function (NEF) and the NF Repository Function (NRF) in FIG. 2 are not shown in FIG. 1 discussed above. However, it should be clarified that all NFs depicted in FIG. 1 can interact with the NEF and the NRF of FIG. 2 as required, though not explicitly indicated in FIG. 1. A main difference between the point-to-point architecture in FIG. 1 and the service-based architecture in FIG. 2 is that the service-based architecture doesn't us predefined point to point interfaces between the NFs. Instead, an NF in the service-based architecture queries the NRF to discover and communicate with other NFs via the SBIs.

Some properties of the NFs shown in FIG. 1 and FIG. 2 may be described in the following manner. The AMF provides UE-based authentication, authorization and mobility management, etc. A UE even if using multiple access technologies is basically connected to a single AMF, since the AMF is independent of the access technologies. The SMF is responsible for session management and allocates IP addresses to UEs and selects and controls the UPF for data transfer with respect to the UEs. If a UE has multiple sessions, different SMFs may be allocated to each session to manage them individually and possibly provide different functionalities per session. The AF provides information on the packet flow to PCF responsible for policy control in order to support Quality of Service (QoS). Based on the information, PCF determines policies about mobility and session management to make AMF and SMF operate properly. The AUSF supports authentication function for UEs and thus stores data for authentication of UEs or similar while UDM stores subscription data of UEs. The Data Network (DN), not part of the 5G core network, provides Internet access or operator services and similar.

The NRF supports the following functionality: 1) maintains the NF profile of available NF instances and their supported services; 2) allows other NF instances to subscribe to, and get notified about, the registration in NRF of new NF instances of a given type; and 3) supports a discovery function. It receives NF Discover requests from NF instances, and provides the information of the available NF instances fulfilling certain search criteria. Features of the NRF are specified in 3GPP Technical Specification (TS) 29.501 (see e.g. 3GPP TS 29.501 v 16.0.0).

A number of 5G core network NFs of different types are always instantiated per default in the 5G core network, e.g. such as an AMF, a NRF, a PCF and a SMF etc. Other 5G core network NFs may be instantiated as needed and several NFs of the same type can also be instantiated if required, e.g. to distribute load to additional NF(s) of the same typ. Thus, an NF instance may be seen as an example or a specimen of a certain NF. Herein, the terms NF and NF instance are used interchangeably, unless otherwise expressly stated or is apparent from the context in which the terms are used. An NF instance exposes one or more NF Service Instances.

FIG. 3 is a message flow diagram illustrating an example of the network function service framework in the service based 5G core network. Among other things, the framework comprises: 1) an NF service registration procedure and 2) an NF discovery and authorization procedure.

Registration Procedure

A core network NF instance in the service based 5G core network registers its NF profile at the NRF. Thus, NF2 (e.g. a AMF) sends a Registration Request to the NRF in action 300a, which request comprises the NF profile of the registering NF2. The NF profile is typically included in the request as a JavaScript Object Notation (JSON) object or other similar data object. The NF profile indicates the one or more NF services that are supported by the registering NF instance. In this example it is assumed that the registering NF2 supports an NF service labeled NF service A. Generally, an NF profile may comprise one or more of the following items for the registering NF: NF type, Fully Qualified Domain Name (FQDN) or IP address, Name(s) of supported service(s), Endpoint information of instance(s) of each supported service and possibly other service parameter. In action 300b the NRF stores the NF profile of the registering NF and preferably marks the NF instance (i.e., NF2 in this example) as available. The NRF may then send a Registration Response to NF2 in action 300c, which response may include the registered NF profile as a confirmation of the registration made by the NRF.

The registration may take place when the NF instance becomes operative for the first time or upon an activation of an individual NF service within the NF instance, e.g. triggered after a scaling operation. The NF instance may register/expose one or more NF services. The information registered for an individual NF service may e.g. indicate security related information to be used for authorizing a discovering NF instance, e.g. security information that indicates the NFs that are allowed to discover the individual NF service, e.g. the type of NFs or the particular NFs of a certain type that are allowed to discover the NF service in question. However, known art NFs that does not produce/support any NF service will not register any service at the NRF. Thus, an NF instance that only consumes one or more NF services will not register anything at the NRF.

Discovery and Authorization

When a first NF instance (e.g., NF1) in the service based 5G core network intends to utilize an NF service supported by a second NF instance (e.g., NF2) the first NF instance will initiate an NF discovery process (a.k.a., NF service discovery process) with the NRF for the NF service in question. Thus, NF2 (e.g., an SMF, an AMF, etc.) sends a Discover request to the NRF in action 302a, which request comprises discovery information. The discovery information may be included in the request as a JSON data object (e.g., file) or similar. The discovery information indicates the expected service to be consumed by the discovering NF (e.g. NF service A mentioned above). Preferably, the discovery information indicates the service name or similar of the expected NF service. Additionally or alternatively, the discovery information may indicate one or more of: the NF type of the expected NF (i.e. the type of NF that is expected to produce the expected NF service) and/or the NF type of the discovering NF. Generally, the NF type may e.g. be any of NSSF, NEF, AUSF, AMF, PCF, SMF, UDM or AF or similar, unless the context in which the NF type is mentioned indicates otherwise.

The NRF authorizes the discover request by determining—based on the discovery information provided in the discover request and preferably also based on the profile registered by relevant expected target NF instance(s)—whether the discovering NF (i.e. the potential service consumer) is authorized to discover the expected NF service and/or NF instance(s) expected to produce the expected service. The discovery and authorization by the NRF is exemplified by action 302b in FIG. 3, wherein the expected target NF instance is NF2 and the potential service consumer is NF1.

For example, if the expected NF instance(s) are deployed in a certain network slice, the NRF may authorize the discover request according to the discovery configuration of the Network Slice, e.g. the expected NF instance(s) may only be discoverable by the NF in the same network slice etc.

When authorized, the NRF determines a set of one or more discovered NF instance(s) that supports the expected service and sends to the requester NF (a.k.a., "service consumer") a response to the discovery request (a.k.a., "query response"). Thus, the NRF sends a response to NF1 in action 302c, which response comprises repository information indicating one or more discovered NF instance(s) that supports the expected service, i.e. that can produce the expected service. The repository information may e.g. indicate one or more of: FQDN, IP address and/or endpoint addresses (e.g. Uniform Resource Locators (URLs) or similar) for said one or more discovered NF instance(s).

SUMMARY

It has been proposed that during a discovery process a service consumer can include some parameters to trim the response to the discovery request ("query response") transmitted by the NRF. For example, it has been accepted to extend the NFDiscover request with an optional query parameter ("limit") defining the maximum number of NFProfiles to be returned in the response to the discovery request. A new query parameter ("max-payload-size") has also been accepted to enable an NF instance to indicate to the NRF the maximum payload size the NF instance expects for the discovery response (e.g. based on data store, cache or HTTP message payload limits the NF instance can support). This allows the NRF to limit the number of NF Profiles it returns in the response such as to not exceed the maximum payload size indicated by the NF instance.

As described below, certain challenges exist.

During an inter AMF mobility procedure for a UE, the target AMF may receive from the source AMF UE context information for the UE, which UE context information includes: pcfId, smsfId, and a sessionContextList that it includes hsmfId and/or vsmfId. The target AMF also needs to consider if the PCF, the SMSF, or the V-SMF needs to be changed, and in 3GPP release 16 (Rel-16), with "Support of deployments topologies with specific SMF Service Areas" as specified in subclause 4.23 in TS 23.502, the I-SMF may be changed, or newly inserted if there is none, or removed if the SMF can directly support the TAI where the UE is camping.

With the introduction of the query parameters "limit" and "max-payload-size", which the service consumer may include in the discovery request (e.g., HTTP GET request), it is likely that the NRF will not be able to return a complete list of the NFs that match the filter criteria included in the discovery request because the NRF can only include a "limited" number of matching NF profiles and the message size shall be smaller than "max-payload-size."

3GPP has introduced additional procedure to enable the requester to retrieve a complete list of matching profiles, however it requires extra signaling round trips (between the requesting NF instance and the NRF) which results in further latency in signaling, e.g. affect the performance of a mobility procedure, especially for handover procedure (which is more time sensitive).

On the other hand, in many inter NF mobility procedures for a UE, the target NF (e.g., a target AMF during an inter AMF mobility procedure (N2 handover) as specified in subclause 4.23.7 of 3GPP TS 23.502 v 16.1.0) needs to determine whether a new I-SMF or V-SMF needs to be selected for a given one of the UE's PDU session or the existing I-SMF or V-SMF can be reused, and also whether a new PCF needs to be selected for Access Mobility Policy control or the existing PCF can continue to be used.

For example, during an inter AMF N2 handover for a PDU session with a I-SMF and SMF involved, the target AMF needs determine whether a new I-SMF needs to be selected, or the current I-SMF can be continued to be used, or whether there is no need for any I-SMF when the UE enters a new Tracking Area (i.e., the I-SMF is removed and the AMF need re-connect to the SMF). As part of the N2 handover procedure, the target AMF will obtain the "target TAI" (i.e. the TAI of the new Tracking Area), and receive the current I-SMF ID and SMF ID.

Per existing specification in 3GPP TS 29.510 v16.0.0, the target AMF can use the SMF ID to retrieve the current SMF's service area, which composes a list of TAIs, and then check whether the current SMF's service area includes the target TAI. If the current SMF's service area includes the target TAI, then there is no need for the current I-SMF, and the current I-SMF can be removed. If the current SMF's service area does not include the target TAI, then the target AMF can use the I-SMF ID to retrieve the current I-SMF's service area, which comprises a list of TAIs, and then check whether the current I-SMF's service area includes the target TAI. If the current I-SMF's service area includes the target TAI, then the current I-SMF can be reused. If the current I-SMF's service area does not include the target TAI, then the target AMF can send to the NRF an NF discovery request that includes filter criteria that enables the NRF to return to the AMF a set of SMF profiles, where each SMF profile in the set is for an SMF instance that serves the TA identified by the target TAI. That is, the filter criteria has the Tracking Area Identity is set to the target TAI and the Target NF Type is set to SMF. Once the target AMF gets the discovery response from the NRF, the target AMF can select one of the SMFs identified in the response as the new I-SMF.

Alternatively, instead of performing all of the steps described in the preceding paragraph, the target AMF could send to the NRF a discovery request that includes the filter criteria that causes the NRF to return profiles of SMFs that serve the TA identified by the target TAI. Once the target AMF gets the response from the NRF, the target AMF can check whether the profile for the current SMF and/or current I-SMF is included in the returned set of profiles. If the profile for the current SMF is included in the returned set of profiles, then then there is no need for the current I-SMF, and the current I-SMF can be removed. If the profile for the current SMF is not included in the returned set of profiles but the current I-SMF's profile is included, then the there is no need to select a new I-SMF. If neither the profile for the current SMF nor the profile for the current I-SMF is included in the returned set of profiles, then the target AMF selects an SMF from among the set of SMFs identified by the discovery response and sets the selected SMF as the new I-SMF.

A disadvantage of the alternatives described above is that a very large number of profiles may match the filter criteria and, hence, the discovery response will most likely contain a very large number of profiles. Moreover, the profiles for the current SMF and current I-SMF may be located at the very end of the array of profiles, which is inefficient. In addition, there lacks of mechanism to allow a service consumer to retrieve more than one target NF. Thus, if the target AMF needs to obtain the profile for the current SMF and the profile for the current I-SMF, the target AMF must send two separate discovery requests to the NRF, which is also inefficient.

Accordingly, this disclosure proposes a mechanism to enable a network entity (e.g., an NF, a network node) to more efficiently determine whether a "preferred candidate" network entity matches a filter criteria (i.e., satisfies the filter criteria). For example, in one embodiment, the mechanism enables a target AMF to more quickly determine whether or not the current SMF and/or current I-SMF serves the target Tracking Area. For example, in one embodiment, the discovery request (e.g., the NF discovery request) transmitted by a network entity to a network repository entity (NRE) (e.g., an instance of a 5G NRF or a similar repository function and/or node) includes a set of one or more query parameters, wherein the set of query parameters includes a set of N number of candidate network entity identifiers (IDs) (N>0), wherein each candidate network entity ID (e.g., candidate NF instance ID) included in the set of candidate network entity IDs identifies a candidate network entity. The NRE generates a response to the discovery request and transmits the response to the requesting network entity (a.k.a., "service consumer"), wherein the response includes a list of profiles that satisfy the filter criteria of the discovery request. In one embodiment, the list is configured such that, for each network entity ID included in the set of candidate network entity IDs, the profile of the network entity identified by the network entity ID is included in the beginning portion of the list (i.e., within the first N profiles of the list). In one embodiment, a profile of a network entity identified by a network entity ID included in the set of candidate network entity IDs is included in the beginning portion of the list regardless of whether or not the network entity identified by the network entity ID satisfies the filter criteria.

Thus, in one particular embodiment, a new query parameter of type array is proposed. This new query parameter may be name "Preferred-Candidates." It is intended that the Preferred-Candidates query parameter will include a set of candidate network entity IDs. In one embodiment, the array comprises a set of tuples, wherein each tuple includes: i) an indicator (e.g., a Boolean value) and ii) a corresponding candidate network entity ID, where the indicator indicates whether or not the profile for the network entity identified by the corresponding candidate network entity ID should be included in the returned list of matching profiles regardless of whether or not the profile for the network entity satisfies the filter criteria. Thus, in one use case, a target AMF may send to an NRE a discovery request comprising a Preferred-Candidates query parameter that contains the ID of the current I-SMF and/or the ID of the current SMF in addition to other query parameter, e.g. TAI and target-nf-type.

Thus, in one aspect there is provided a method performed by a network entity (e.g., an AMF). The method includes the network entity (e.g., instance of an AMF) generating a discovery request (e.g., an NF discovery request), wherein the discovery request comprises a set of query parameters, the set of query parameters comprising a set of candidate network entity IDs comprising at least a first candidate network entity ID (e.g., an I-SMF instance ID), wherein each candidate network entity ID included in the set of candidate network entity IDs identifies a candidate network entity. The method also includes the network entity transmitting the discovery request to an NRE.

In another aspect there is provided a method performed by an NRE. The method includes the NRE receiving a discovery request transmitted by a network entity (e.g., an instance of an AMF), wherein the received discovery request comprises a set of query parameters, the set of query parameters comprising a set of candidate network entity identifiers, IDs, comprising at least a first candidate network entity id, wherein each candidate network entity ID included in the set of candidate network entity IDs identifies a candidate network entity. The method also includes the NRE transmitting to the network entity a discovery response responding to the discovery request.

An advantage of the above described embodiments is that it can greatly improve the efficiency of the service consumer. For example, in the use case of a target AMF that needs to determine whether or not to replace or remove a current I-SMF, the AMF can more efficiently obtain the profile information that it needs to make this determination, as well as other profiles, by including the ID of the current I-SMF in a set of candidate network entity IDs included in the discover request. In one embodiment, NRE is configured to position the needed profile information in the beginning portion of a list of profiles rather than located in a random position within the list. In another embodiment, the discovery response will include a response parameter that declares whether or not the current SMF satisfies the filter criteria and whether or not the current I-SMF satisfies the filter criteria. Thus, in this embodiment an efficiency is gained because there is the potential that the target AMF can determine, for example, that the current I-SMF does not need to be replaced or removed without the target AMF having to parse any profile included in the list of matching profiles included in the discovery response.

BRIEF DESCRIPTION OF THE DRAWINGS

The accompanying drawings, which are incorporated herein and form part of the specification, illustrate various embodiments.

DETAILED DESCRIPTION

Figure 4:
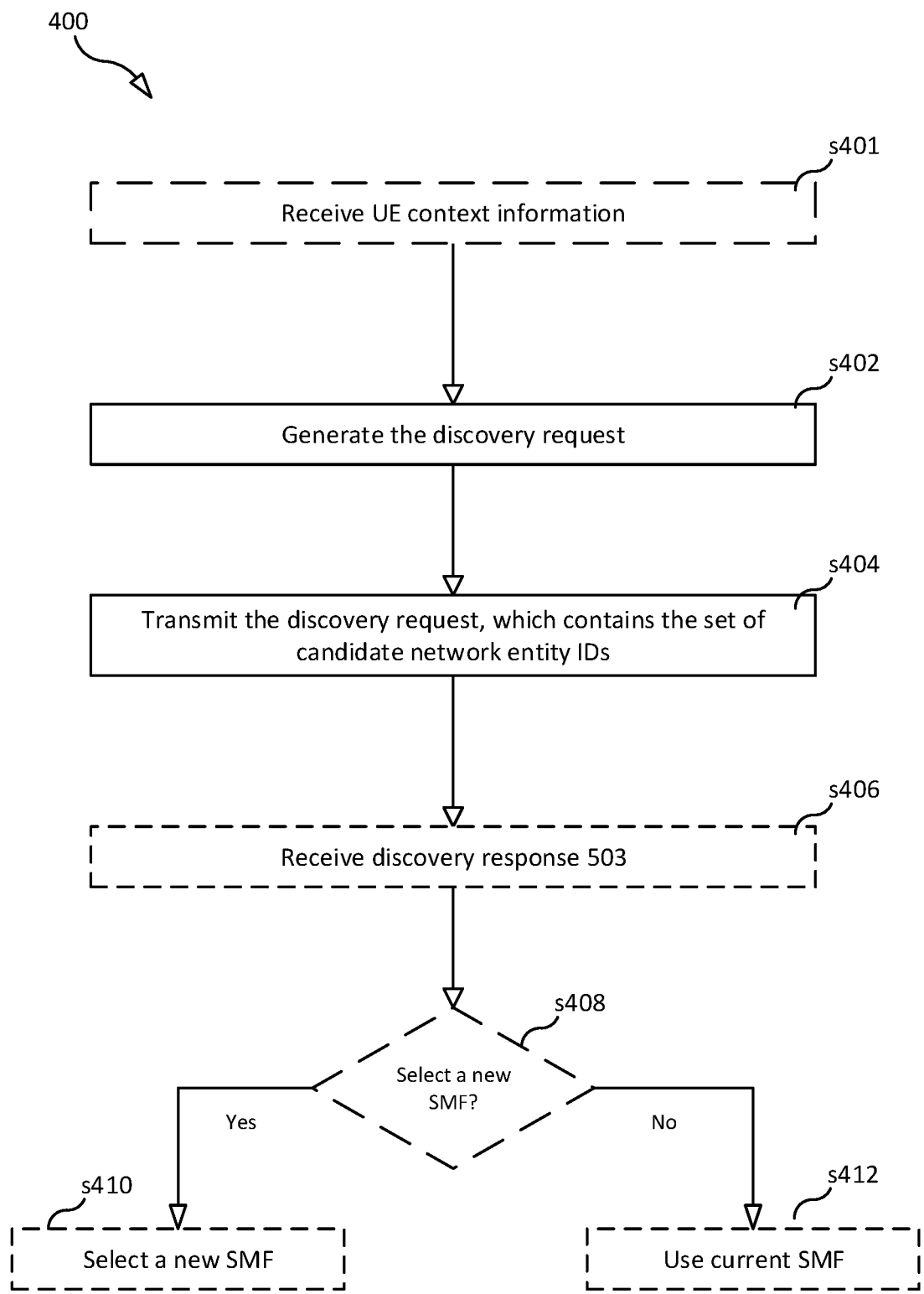
FIG. 4 is a flowchart illustrating a process according to an embodiment.

FIG. 4 is a flowchart illustrating a process 400 according to an embodiment. Process 400 may begin in step s402.

Figure 5:
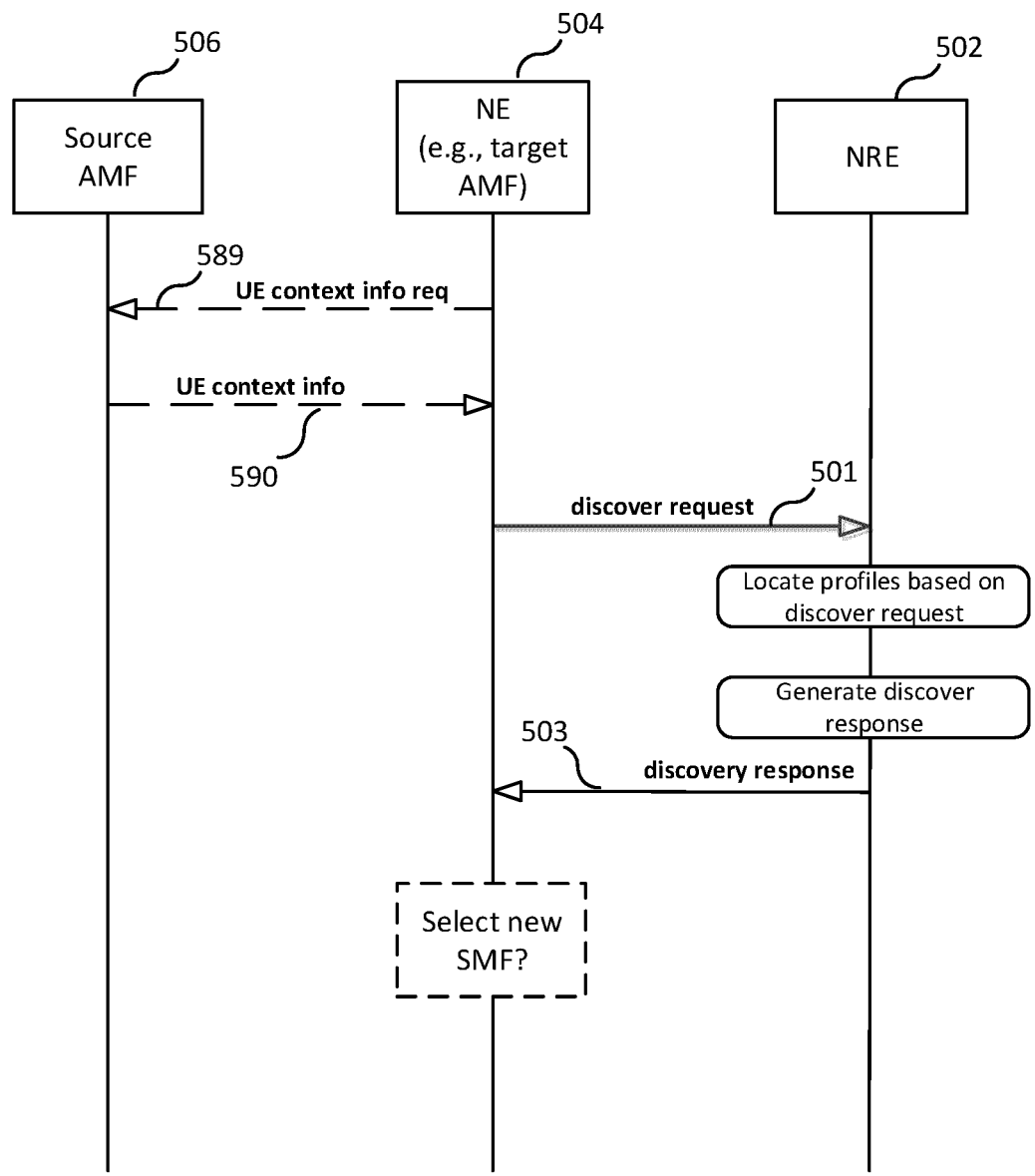
FIG. 5 is a message flow diagram illustrating an embodiment.

Step s402 comprises a first network entity 504 (or "NE 504" for short) (e.g., an AMF) (see FIG. 5) generating a discovery request 501, wherein the discovery request comprises a set of query parameters. The set of query parameters comprises a set of candidate network entity IDs comprising at least a first candidate network entity ID (e.g., an I-SMF instance ID), wherein each candidate network entity ID included in the set of candidate network entity IDs identifies a candidate network entity. In one embodiment, the set of query parameters further comprises filter criteria for use by an NRE 502 (or "NRE 502" for short) to determine network entities that satisfy the filter criteria, and the set of candidate network entity IDs is not a part of the filter criteria.

Figure 1:
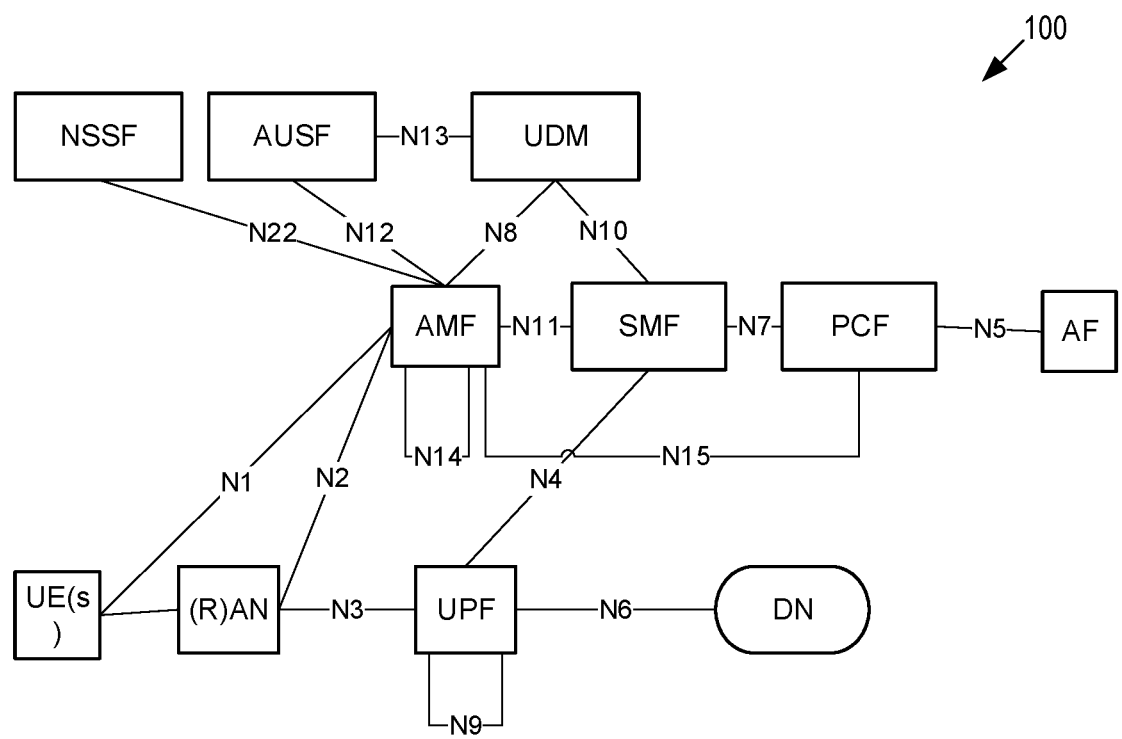
FIG. 1 illustrates a wireless communication system represented as a 5G network architecture composed of NFs using point to point reference points or interfaces.
Figure 2:
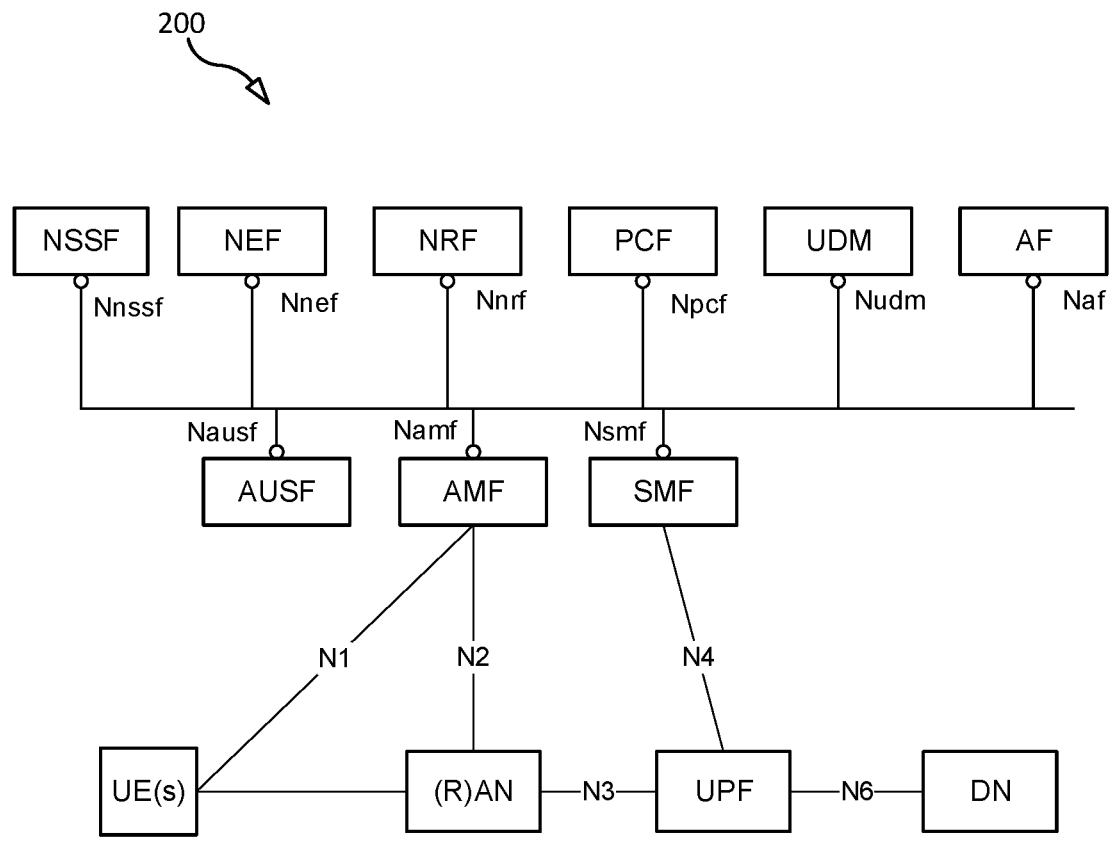
FIG. 2 illustrates a 5G network architecture using service-based interfaces (SBIs) between the NFs in the control plane, instead of the point-to-point reference points/interfaces used in the 5G network architecture of FIG. 1.
Figure 3:
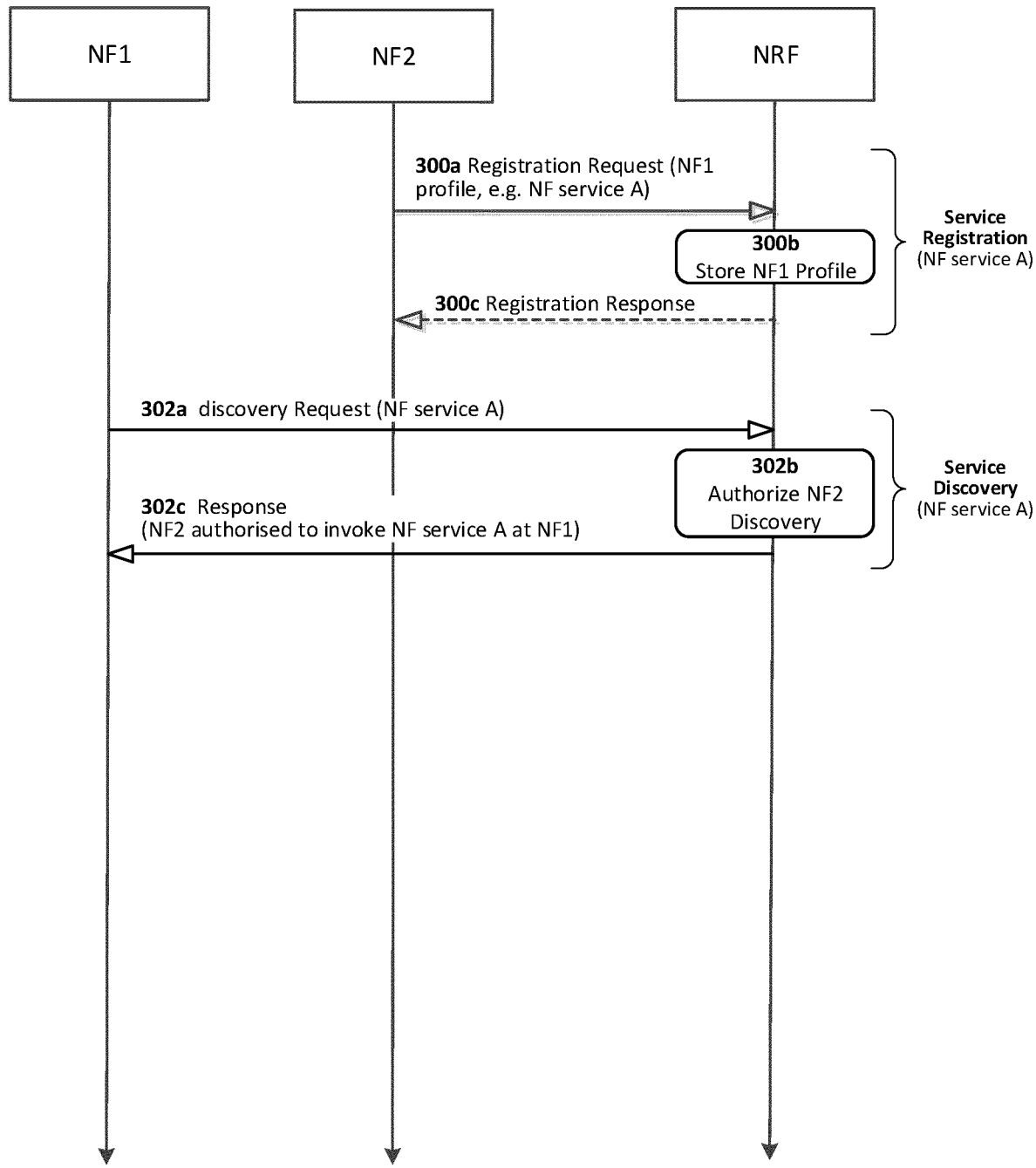
FIG. 3 is a message flow diagram illustrating an example of the network function service framework in the service based 5G core network.

Unless it is otherwise clear from the context in which the term is used, a network entity 504 may e.g. be any of a NSSF, a NEF, a NRF, a PCF, an UDM, an AUSF, an AMF a SMF or an UPF as shown in FIG. 2, or any other similar network function or node. A network entity may be implemented either as a network element on a dedicated hardware, as a software instance running on a dedicated hardware, or as a virtualized function instantiated on an appropriate platform, e.g., a cloud infrastructure. A virtualized function may be a function in which at least a portion of the functionality of the function is implemented as a virtual component(s) (e.g., via a virtual machine(s) executing on one or more physical processing node(s) in a network).

Step s404 comprises NE 504 transmitting the discovery request 501 to NRE 502. The discovery request 501 may be a Hypertext Transfer Protocol (HTTP) GET request that comprises the set of query parameters (the GET request may also include the string "nnrf-disc" or other value to indicate to the NRE that the requestor NE 504 is invoking the Discovery Service procedure). In one embodiment, in addition to the query parameter that contains the set of candidate network entity IDs, other query parameters may be included in the GET request, including the query parameters described in table 6.2.3.2.3.1-1 of 3GPP TS 29.510 V16.0.0 ("TS 29.510").

Table 1 below provides descriptions for various query parameters that may be included in request 501.

TABLE 1

List of the Possible Query Parameters included in a discovery request

| Name | Data type | P | Cardinality | Description | Applicability |
|---|---|---|---|---|---|
| target-nf-type | NFType | M | 1 | This IE shall contain the NF type of the NF Service Producer being discovered. | |
| requester-nf-type | NFType | M | 1 | This IE shall contain the NF type of the NF Service Consumer that is invoking the Nnrf_NFDiscovery service. | |
| requester-nf-instance-id | NfInstanceId | O | 0 ... 1 | If included, this IE shall contain the NF instance id of the NF service consumer. | Query-Params-Ext2 |
| service-names | array(ServiceName) | O | 1 ... N | If included, this IE shall contain an array of service names for which the NRF is queried to provide the list of NF profiles. The NRF shall return the NF profiles that have at least one NF service matching the NF service names in this list. The NF service names returned by the NRF shall be an intersection of the NF service names requested and the NF service names registered in the NF profile. If not included, the NRF shall return all the NF service names registered in the NF profile. | |
| requester-nf-instance-fqdn | Fqdn | O | 0 ... 1 | If included, this IE shall contain the FQDN of the NF Service Consumer that is invoking the Nnrf_NFDiscovery service. The NRF shall use this to return only those NF profiles that include at least one NF service containing an entry in the "allowedNfDomains" list (see clause 6.1.6.2.3) that matches the domain of the requester NF. | |
| target-plmn-list | array(PlmnId) | C | 1 ... N | This IE shall be included when NF services in a different PLMN, or NF services of specific PLMN ID(s) in a same PLMN comprising multiple PLMN IDs, need to be discovered. When included, this IE shall contain the PLMN ID of the target NF. If more than one PLMN ID is included, NFs from any PLMN ID present in the list matches the query parameter. For inter-PLMN service discovery, at most 1 PLMN ID shall be included in the list; it shall be included in the service discovery from the NF in the source PLMN sent to the NRF in the same PLMN, while it may be absent in the service discovery request sent from the source NRF to the target NRF. In such case, if the NRF receives more than 1 PLMN ID, it shall only consider the first element of the array, and ignore the rest. | |
| requester-plmn-list | array(PlmnId) | C | 1 ... N | This IE shall be included when NF services in a different PLMN need to be discovered. When included, this IE shall contain the PLMN ID(s) of the requester NF. | |
| target-nf-instance-id | NfInstanceId | O | 0 ... 1 | Identity of the NF instance being discovered. | |
| target-nf-fqdn | Fqdn | O | 0 ... 1 | FQDN of the target NF instance being discovered. | |
| hnrf-uri | Uri | C | 0 ... 1 | If included, this IE shall contain the API URI of the NFDiscovery Service (see clause 6.2.1) of the home NRF. It shall be included if the NF Service Consumer has previously received such API URI to be used for service discovery (e.g., from the NSSF in the home PLMN). | |
| snssais | array(Snssai) | O | 1 ... N | If included, this IE shall contain the list of S-NSSAIs that are served by the NF Instances being discovered. The NRF shall return those NF profiles of NF Instances that have at least one of the S-NSSAIs in this list. The S-NSSAIs included in the NF profiles of NF Instances returned by the NRF shall be an intersection of the S-NSSAIs requested and the S-NSSAIs supported by those NF Instances. | |
| requester-snssais | array(Snssai) | O | 1 ... N | If included, this IE shall contain the list of S-NSSAI of the requester NF. The NRF shall use this to return only those NF profiles of NF Instances allowing to be discovered from the slice(s) identified by this IE, according to the "allowedNssais" list in the NF Profile and NF Service (see clause 6.1.6.2.2 and 6.1.6.2.3). | |
| plmn-specific-snssai-list | array(PlmnSnssai) | O | 1 ... N | If included, this IE shall contain the list of S-NSSAI that are served by the NF service being discovered for the corresponding PLMN provided. The NRF shall use this to identify the NF services that have registered their support for the S-NSSAIs for the corresponding PLMN given. The NRF shall return the NF profiles that have at least one per PLMN S-NSSAI entry matching the PLMN specific S-NSSAIs provided in this list. The per PLMN list of S-NSSAIs included in the NF profile returned by the NRF shall be an intersection of the list requested and the list registered in the NF profile. | |

TABLE 1-continued

List of the Possible Query Parameters included in a discovery request

| Name | Data type | P | Cardinality | Description | Applicability |
|---|---|---|---|---|---|
| nsi-list | array(string) | O | 1 . . . N | If included, this IE shall contain the list of NSI IDs that are served by the services being discovered. | |
| dnn | Dnn | O | 0 . . . 1 | If included, this IE shall contain the DNN for which NF services serving that DNN is discovered. DNN may be included if the target NF type is "BSF", "SMF" or "UPF". If the Snssai(s) are also included, the NF services serving the DNN shall be available in the network slice(s) identified by the Snssai(s). | |
| smf-serving-area | string | O | 0 . . . 1 | If included, this IE shall contain the serving area of the SMF. It may be included if the target NF type is "UPF". | |
| tai | Tai | O | 0 . . . 1 | Tracking Area Identity. | |
| amf-region-id | AmfRegionId | O | 0 . . . 1 | AMF Region Identity. | |
| amf-set-id | AmfSetId | O | 0 . . . 1 | AMF Set Identity. | |
| guami | Guami | O | 0 . . . 1 | Guami used to search for an appropriate AMF. (NOTE 1) | |
| supi | Supi | O | 0 . . . 1 | If included, this IE shall contain the SUPI of the requester UE to search for an appropriate NF. SUPI may be included if the target NF type is e.g. "PCF", "CHF", "AUSF", "UDM" or "UDR". | |
| ue-ipv4-address | Ipv4Addr | O | 0 . . . 1 | The IPv4 address of the UE for which a BSF needs to be discovered. | |
| ip-domain | string | O | 0 . . . 1 | The IPv4 address domain of the UE for which a BSF needs to be discovered. | |
| ue-ipv6-prefix | Ipv6Prefix | O | 0 . . . 1 | The IPv6 prefix of the UE for which a BSF needs to be discovered. | |
| pgw-ind | boolean | O | 0 . . . 1 | When present, this IE indicates whether a combined SMF/PGW-C or a standalone SMF needs to be discovered. true: A combined SMF/PGW-C is requested to be discovered; false: A standalone SMF is requested to be discovered. (See NOTE 2) | |
| pgw | Fqdn | O | 0 . . . 1 | If included, this IE shall contain the PGW FQDN which is received by the AMF from the MME to find the combined SMF/PGW. | |
| gpsi | Gpsi | O | 0 . . . 1 | If included, this IE shall contain the GPSI of the requester UE to search for an appropriate NF. GPSI may be included if the target NF type is "CHF", "UDM" or "UDR". | |
| external-group-identity | GroupId | O | 0 . . . 1 | If included, this IE shall contain the external group identifier of the requester UE to search for an appropriate NF. This may be included if the target NF type is "UDM" or "UDR". | |
| data-set | DataSetId | O | 0 . . . 1 | Indicates the data set to be supported by the NF to be discovered. May be included if the target NF type is "UDR". | |
| routing-indicator | string | O | 0 . . . 1 | Routing Indicator information that allows to route network signalling with SUCI (see 3GPP TS 23.003 [12]) to an AUSF and UDM instance capable to serve the subscriber. May be included if the target NF type is "AUSF" or "UDM". | |
| group-id-list | array(NfGroupId) | O | 1 . . . N | Identity of the group(s) of the NFs of the target NF type to be discovered. May be included if the target NF type is "UDR", "UDM", "PCF" or "AUSF". | |
| dnai-list | array(Dnai) | O | 1 . . . N | If included, this IE shall contain the Data network access identifiers. It may be included if the target NF type is "UPF". | |
| upf-iwk-eps-ind | boolean | O | 0 . . . 1 | When present, this IE indicates whether a UPF supporting interworking with EPS needs to be discovered. true: A UPF supporting interworking with EPS is requested to be discovered; false: A UPF not supporting interworking with EPS is requested to be discovered. (NOTE 3) | |
| chf-supported-plmn | PlmnId | O | 0 . . . 1 | If included, this IE shall contain the PLMN ID that a CHF supports (i.e., in the PlmnRange of ChfInfo attribute in the NFProfile). This IE may be included when the target NF type is "CHF". | |
| preferred-locality | string | O | 0 . . . 1 | Preferred target NF location (e.g. geographic location, data center). When present, the NRF shall prefer NF profiles with a locality attribute that matches the preferred-locality. The NRF may return additional NFs in the response not matching the preferred target NF location, e.g. if no NF profile is found matching the preferred target NF location. The NRF should set a lower priority for any additional NFs on the response not matching the preferred target NF location than those matching the preferred target NF location. | |

TABLE 1-continued

List of the Possible Query Parameters included in a discovery request

| Name | Data type | P | Cardinality | Description | Applicability |
|---|---|---|---|---|---|
| access-type | AccessType | C | 0 . . . 1 | If included, this IE shall contain the Access type which is required to be supported by the target Network Function (i.e. SMF). | |
| supported-features | SupportedFeatures | O | 0 . . . 1 | List of features required to be supported by the target Network Function. This IE may be present only if the service-names attribute is present and if it contains a single service-name, or if the target Network Function does not support any service. It shall be ignored by the NRF otherwise. (NOTE 4) | |
| required-features | array(SupportedFeatures) | O | 1 . . . N | List of features required to be supported by the target Network Function, as defined by the supportedFeatures attribute in NFService (see clauses 6.1.6.2.3 and 6.2.6.2.4). This IE may be present only if the service-names attribute is present. When present, the required-features attribute shall contain as many entries as the number of entries in the service-names attribute. The $n^{th}$ entry in the required-features attribute shall correspond to the $n^{th}$ entry in the service-names attribute. An entry corresponding to a service for which no specific feature is required shall be encoded as "0". | Query-Params-Ext1 |
| complex-query | ComplexQuery | O | 0 . . . 1 | This query parameter is used to override the default logical relationship of query parameters. | Complex-Query |
| limit | integer | O | 0 . . . 1 | Maximum number of NFProfiles to be returned in the response. | Query-Params-Ext1 |
| max-payload-size | integer | O | 0 . . . 1 | Maximum payload size (before compression, if any) of the response, expressed in kilo octets. When present, the NRF shall limit the number of NF profiles returned in the response such as to not exceed the maximum payload size indicated in the request. Default = 124. Maximum = 2000 (i.e. 2 Mo). | Query-Params-Ext1 |
| pdu-session-types | array(PduSessionType) | O | 1 . . . N | List of the PDU session type (s) requested to be supported by the target Network Function (i.e UPF). | Query-Params-Ext1 |
| event-id-list | array(EventId) | O | 1 . . . N | If present, this attribute shall contain the list of events requested to be supported by the Nnwdaf AnalyticsInfo Service, the NRF shall return NF which support all the requested events. | Query-Param-Analytics |
| nwdaf-event-list | array(NwdafEvent) | O | 1 . . . N | If present, this attribute shall contain the list of events requested to be supported by the Nnwdaf_EventsSubscription service, the NRF shall return NF which support all the requested events. | Query-Param-Analytics |
| atsss-capability | AtsssCapability | O | 0 . . . 1 | When present, this IE indicates the ATSSS capability of the target UPF needs to be supported. | MAPDU |
| upf-ue-ip-addr-ind | boolean | O | 0 . . . 1 | When present, this IE indicates whether a UPF supporting allocating UE IP addresses/prefixes needs to be discovered. true: a UPF supporting UE IP addresses/prefixes allocation is requested to be discovered; false: a UPF not supporting UE IP addresses/prefixes allocation is requested to be discovered. | Query-Params-Ext2 |
| Preferred-candidates | Array(NfCandidate) | O | 1 . . . N | Includes a set of one or more candidate NF instance ids | |

As shown above, one of the potential query parameters is the "Preferred-candidates" query parameter, which is an array of data objects of type NfCandidate. In one use case, the "Preferred-candidates" query parameter contains the set of candidate network entity identifiers. Thus, in some embodiments, NfCandidate has the same definition as NfInstanceId, which is the id of a network entity.

In other embodiments, NfCandidate is defined as shown below in table 2.

TABLE 2

Definition of Type NfCandidate

| Attribute name | Data type | P | Cardinality | Description |
|---|---|---|---|---|
| nfInstanceId | NfInstanceId | M | 1 | Id of candidate NF instance |
| inclusionInd | Boolean or InclusionInd | O | 1 | This IE indicates whether or not the NF instance profile for the candidate NF instance identified by the NF instance ID should be included in the |

TABLE 2-continued

Definition of Type NfCandidate

| Attribute name | Data type | P | Cardinality | Description |
|---|---|---|---|---|
| | | | | response to the request (i.e., included in the nfInstances array of the SearchResult) True: the candidate NF instance profile will be included even it does not match the filter criteria; False: the candidate NF instance profile will be not included if it does not match the filter criteria. |

As shown in table 2, the "Preferred-candidates" query parameter of discovery request 501 may include a set of tuples (i.e., [nfInstanceId, inclusionInd]), wherein each tuple includes: i) an inclusion indicator (a.k.a., "inclusionInd"), which may be a boolean value, and ii) a corresponding candidate network entity ID, where the inclusion indicator indicates whether or not the profile for the network entity identified by the corresponding candidate network entity ID should be included in the returned list of matching profiles regardless of whether or not the profile for the network entity satisfies the filter criteria of discovery request 501. Thus, in one use case, a target AMF may send to NRE 502 a discovery request 501 comprising a Preferred-Candidates query parameter that contains the ID of the current I-SMF and/or the ID of the current SMF in addition to filter criteria, e.g. values for the TAI and target-nf-type query parameters.

After receiving discovery request 501, NRE 502 searches for network entity profiles that satisfy a search criteria. In one embodiment, the search criteria is the same as the filter criteria included in the discover request 501. Thus, in one embodiment, the profiles that match the search criteria will match the filter criteria included in discovery request 501. In another embodiment the search criteria is based on the filter criteria included in the discover request 501 but is broader than the filter criteria. For example, assume that the set of candidate network entity IDs includes two IDs: SMF-ID1 and SMF-ID2, and assume that the filter criteria is: tai=target-TAI (i.e., the TAI where a UE is currently located) and target-nf-type=SMF. With this assumption the search criteria (a.k.a., "search query") in one embodiment is: [(tai=target-TAI AND target-nf-type=SMF) OR (target-nf-instance-id=(SMF-ID1 OR SMF-ID2))]. This search query will return at least two profiles—i.e., the profile for the SMF identified by SMF-ID1 and the profile for the SMF identified by SMF-ID2. Additionally, this search query will return the zero or more SMF profiles that indicate that the SMF service area includes the target-TAI (i.e. the SMF profiles that satisfy the filter criteria). After performing the search, NRE 502 transmits a discovery response 503 (e.g., HTTP GET response) responding to request 501, which response includes at least some of the profiles that match the search criteria.

Accordingly, a step s406 (optional) comprises NE 504 receiving (directly or indirectly) from NRE 502 discovery response 503.

In one embodiment, the set of candidate network entity IDs consists of N number of candidate network entity IDs (N>0), the discovery response 503 comprises an array of M number of network entity profiles (M>N), and the NRE 502 is configured such that, as a result of the first candidate network entity ID i) identifying a network entity that satisfies the filter criteria and ii) being included in the set of N candidate network entity IDs, the NRE 502 places the network entity profile of the network entity identified by the first candidate network entity ID in one of the first N positions of the array of M network entity profiles. In this way, the profiles for the candidate network entities that match the filter criteria are placed in the beginning portion of the profile array included in discovery response 503.

In another embodiment, the response 503 comprises an array of network entity profiles, the array of network entity profiles comprises a first network entity profile that corresponds to the first candidate network entity ID (i.e., the first network entity profile is the profile for the network entity identified by the first candidate network entity ID), and the first network entity profile is included in the array of network entity profiles regardless of whether or not the first network entity profile satisfies the filter criteria.

In one embodiment, the set of candidate network entities IDs consists of N number of candidate network entity IDs (N>0), the array of network entity profiles comprises M number of network entity profiles (M is >N), and the NRE 502 includes the network entity profile corresponding to the first candidate network entity ID in one of the first N positions of the array of network entity profiles regardless of whether or not the first candidate network entity ID identifies a network entity that satisfies the filter criteria (i.e., regardless of whether or not the network entity profile corresponding to the first candidate network entity ID satisfies the filter criteria). In this way, the profiles for the candidate network entities are placed in the beginning portion of the profile array included in response 503 regardless of whether or not the profile for the candidate network entity satisfies the filter criteria.

In one embodiment, discovery response 503 includes a SearchResult data object that comprises a set of attribute values and the set of attribute values may include the array of network entity profiles. For instance, in one embodiment, the SearchResult object may be defined as shown the table below:

TABLE 3

Definition of Type SearchResult

| Attribute name | Data type | P | Cardinality | Description |
| --- | --- | --- | --- | --- |
| validityPeriod | Integer | M | 1 | time in seconds during which the discovery result is considered valid and can be cached by the NF Service Consumer. This value shall be the same as the value contained in the "max-age" parameter of the "Cache-Control" header field sent in the HTTP response. |
| nfInstances | array(NFProfile) | M | 0 . . . N | It shall contain an array of NF Instance profiles, where each profile in the array i) matches the search criteria indicated by the query parameters of the discovery request and/or ii) was explicitly requested to be included in the array regardless of whether the profiles matched the search criteria. |
| searchId | String | O | 0 . . . 1 | This IE may be present if the NRF stores the result of the current service discovery response in a given URL (server-side caching), to make it available in the future to NF Service Consumers without having to compute the whole search process again. |
| numNfInstComplete | Uint32 | O | 0 . . . 1 | May be present when the total number of NF Instances found by NRF is higher than the actual number of NF Instances included in the attribute nfInstances of the SearchResult object. This may happen due to the NF Service Consumer including in the discovery request parameters such as "limit" or "max-payload-size". |
| nrfSupportedFeatures | SupportedFeatures | C | 0 . . . 1 | Features supported by the NRF for the NFDiscovery service (see clause 6.2.9). This IE should be present if the NRF supports at least one feature. |
| canInfo | array(Caninfo) | O | 1 . . . N | Includes the set of candidate NF instance ids included in the Preferred-candidates array of the discovery request and an indication for each candidate NF instance id that indicates whether or not the NF instance profile for the identified candidate NF instance matched the search criteria |

As shown above, one of the potential parameters in the SearchResult data object is the "canInfo" parameter, which is an array of data objects of type Caninfo. Each such data object includes, at the least, one of the candidate network entity IDs that was included in the set of candidate network entity IDs included in request 501. In one embodiment, each candidate network entity IDs included in request 501 is included in the canInfo object. An example definition of Caninfo is shown below in table 4.

the network entity identified by the corresponding candidate network entity ID matched the filter criteria of the discovery request 501.

In a use case where NE 504 is a target AMF, process 400 may further include step s401, which occurs before step s402. Step s401 comprises target AMF 504 receiving (directly or indirectly) from source AMF 506 user equipment, UE, a message 590 containing context information for a UE that has an established PDU session, wherein the UE context

TABLE 4

Definition of type Caninfo

| Attribute name | Data type | P | Cardinality | Description |
| --- | --- | --- | --- | --- |
| candidate-nfInstanceId | NfInstanceId | M | 1 | Identity of the NF instance being discovered. |
| matchFilter | boolean | M | 1 | true: the candidate NF profile matched the filter criteria; false: the candidate NF profile did not match the filter criteria. |

As shown in table 4, the "canInfo" parameter of discovery response 503 may include a set of tuples (i.e., [candidate-nfInstanceId, matchFilter]), wherein each tuple includes: i) a matchFilter indicator, which may be a boolean value, and ii) a corresponding candidate network entity ID, where the matchFilter indicator indicates whether or not the profile for information comprises PDU context information associated with the PDU session, and the PDU context information comprises a first Session Management Function, SMF, ID identifying a current anchor SMF for the PDU session and a second SMF ID identifying a current intermediate SMF, I-SMF, for the PDU session. For example, the UE context information may include a data object of type PduSession-Context, wherein PduSessionContext is defined as shown in the table below:

TABLE 5

Definition of PduSessionContext

| Attribute name | Data type | P | Cardinality | Description |
|---|---|---|---|---|
| pduSessionId | PduSessionId | M | 1 | Indicates the identifier of the PDU Session. |
| smContextRef | Uri | M | 1 | Indicates the URI of the SM context, including the apiRoot (see clause 6.1.3.3.2 of 3GPP TS 29.502 [16]). (For a PDU session associated with a I-SMF, the URI of the SM context is received from the current I-SMF) |
| sNssai | Snssai | M | 1 | Indicates the associated S-NSSAI for the PDU Session. |
| Dnn | Dnn | M | 1 | Indicates the Data Network Name. |
| accessType | AccessType | M | 1 | Indicates the access type of the PDU session. |
| allocatedEbiList | array(EbiArpMapping) | C | 1 . . . N | This IE shall be present when at least one EBI is allocated to the PDU session. When present, this IE shall contain the EBIs currently allocated to the PDU session. |
| hsmfId | NfInstanceId | C | 0 . . . 1 | This IE shall be present for non-roaming and home-routed PDU sessions. When present, it shall indicate the associated home SMF for the PDU Session. |
| vsmfId | NfInstanceId | C | 0 . . . 1 | This IE shall be present if roaming PDU sessions. When present, it shall indicate the associated visit SMF for the PDU Session. |
| ismfId | NfInstanceId | C | 0 . . . 1 | This IE shall be present if the PDU session is associated with an I-SMF. When present, it shall indicate the current I-SMF for the PDU session. |
| nsInstance | NsiId | C | 1 | This IE shall be present if available. When present, this IE shall Indicate Network Slice Instance for the PDU Session |
| smfServiceInstanceId | String | O | 0 . . . 1 | When present, this IE shall contain the serviceInstanceId of the SMF service instance serving the PDU session Context. This IE may be used by the AMF to identify PDU session contexts affected by a failure or restart of the SMF service instance (see clause 6.2 of 3GPP TS 23.527 [33]). |

As noted above, in this use particular case, the target AMF may send to NRE 502 a discovery request 501 comprising a Preferred-Candidates query parameter that contains the ID of the current I-SMF as obtained from the PduSessionContext data object (e.g., the ismfId) and/or the ID of the current SMF as obtained from the PduSessionContext data object (e.g., the hsmfId). In addition, the discovery request contains filter criteria, e.g. a value for the TAI query parameter and a value for the target-nf-type query parameter (in this case, target-nf-type=SMF).

In embodiments where the UE is in idle mode, the target AMF may receive a registration request transmitted by the UE, which may trigger the target AMF to send to the source AMF a request 589 for context information for the UE. In embodiments, where the UE is in connected mode, the source AMF may receive a handover required message from the base station serving the UE and, which may trigger the source AMF to send to the target AMF the message 590 containing the context information for the UE.

Additionally, in the use case where NE 504 is the target AMF, process 400 may further include step s408, s410, and s412. In step s408, the target AMF uses information provided by the discovery response 503 to determine whether the AMF needs to select a new SMF. In step s410, in response to determining that a new SMF needs to be selected, the AMF selects a new SMF, otherwise the AMF will use the current SMF. For example, the target AMF can use information provided by the discovery response 503 to determine that a current I-SMF should be removed or replaced.

For example, in the case where the PduSessionContext data object includes an ismfId and a hsmfId, the target AMF can use the information provided by the discovery response 503 to determine whether the SMF identified by the hsmfId and/or the SMF identified by the ismfId serves the Tracking Area in which the UE is current located (assuming the filter criteria comprises: tai=target Tracking Area and target-nf-type=SMF and the set of entity IDs included in the discovery requests includes ismfId and hsmfId). As noted above, if the SMF identified by hsmfId serves the target Tracking Area then the SMF identified by ismfId can be removed (i.e., an intermediate SMF is not needed). And if the SMF identified by hsmfId does not serve the target Tracking Area but the SMF identified by ismfId does serve the target Tracking Area, then no new SMF needs to be selected, otherwise a new intermediate SMF will need to be selected to replace the SMF identified by ismfId.

In one embodiment, the target AMF can determine whether the SMF identified by the hsmfId serves the Tracking Area in which the UE is current located by examining the canInfo data object included in discovery response. More specifically, the canInfo data object includes a tuple comprising a matchfilter value and the hsmfId, and the target AMF can determine whether the SMF identified by the hsmfId serves the Tracking Area in which the UE is current located (i.e., the "target" Tracking Area) by examining this matchFilter value, which value will indicate whether or not the SMF identified by the hsmfId matches the filter criteria, and hence, will indirectly indicate whether or not the SMF identified by the hsmfId serves the target Tracking Area. Alternatively, in cases where the discovery response 503 does not include a canInfo data object, the target AMF can go through the array of SMF profiles that match the filter criteria to determine whether or not the array of SMF profiles includes the profile for the SMF identified by hsmfId. Advantageously, in one embodiment, the NRE 502 is configured such that, if profile for the SMF identified by hsmfId matches the filter criteria, then the NRE 502 will include the profile in the top portion of the array of profiles (e.g., within the first N positions of the array where N is the number of network entity IDs included in the Preferred-Candidates query parameter. In this way, the target AMF need to review at most N profiles within the array in order to determine whether the SMF identified by hsmfId serves the target Tracking Area. Using the same process described above, the target AMF can also determine whether the SMF identified by ismfId serves the target Tracking Area.

Figure 6:
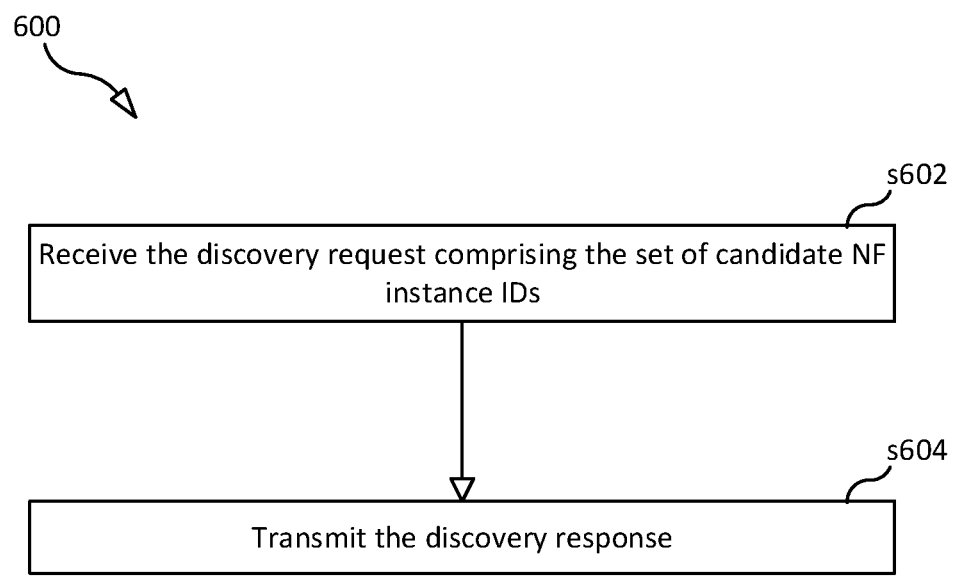
FIG. 6 is a flowchart illustrating a process according to an embodiment.

FIG. 6 is a flowchart illustrating a process 600 according to an embodiment that is performed by NRE 502. Process 600 may begin in step s602.

Step s602 comprises NRE 502 receiving discovery request 501 transmitted by NE 504, wherein the received discovery request comprises a set of query parameters, the set of query parameters comprising a set of candidate network entity IDs. The set of candidate network entity IDs comprising at least a first candidate network entity ID, wherein each candidate network entity ID included in the set of candidate network entity IDs identifies a candidate network entity. In some embodiments, the set of query parameters further comprises filter criteria for use by NRE 502 to determine network entities that satisfy the filter criteria, and the set of candidate network entity IDs is not a part of the filter criteria. Step s604 comprises NRE 502 transmitting to the NE 504 discovery response 503, which is responsive to discovery request 501 (i.e., discovery response 503 includes an array of profiles that satisfy the filter criteria included in request 501).

In some embodiments, the set of candidate network entities IDs consists of N number of candidate network entity IDs (N>0), the discovery response comprises an array of M number of network entity profiles (M>N). In such an embodiment, the process further comprises NRE 502 generating the discovery response, where generating the discovery response comprises:

1) NRE 502 determining that the first candidate network entity ID i) identifies a network entity that satisfies the filter criteria and ii) is included in the set of N candidate network entity IDs; and 2) as a result of determining that the first candidate network entity ID i) identifies a network entity that satisfies the filter criteria and ii) is included in the set of N candidate network entity IDs, NRE 502 generates the array of M network entity profiles such that the network entity profile of the network entity identified by the first candidate network entity ID is located in one of the first N positions of the array of M network entity profiles. In this way, the profiles for the candidate network entities are placed in the beginning portion of the profile array included in response 503.

In another embodiment, generating the discovery response comprises:

1) NRE 502 determining that the first candidate network entity ID is included in the set of N candidate network entity IDs; and 2) as a result of determining that the first candidate network entity ID is included in the set of N candidate network entity IDs, NRE 502 generates the array of network entity profiles such that the network entity profile of the network entity identified by the first candidate network entity ID is located in one of the first N positions of the array of network entity profiles.

In some embodiments, the set of query parameters further includes an inclusion indicator value that indicates whether or not a network entity profile corresponding to the first candidate network entity ID should be included in the array of profiles even if the network entity profile does not satisfy the filter criteria.

In some embodiments, the discovery response 503 comprises a data object (e.g., a canInfo data object) that contains each said candidate network entity ID, and, for each said candidate network entity ID, the data object further comprises a matchFilter indicator corresponding to the candidate network entity ID, and each matchFilter indicator indicates whether or not the network entity profile of the candidate network entity identified by the corresponding candidate network entity ID satisfies the filter criteria.

Figure 7:
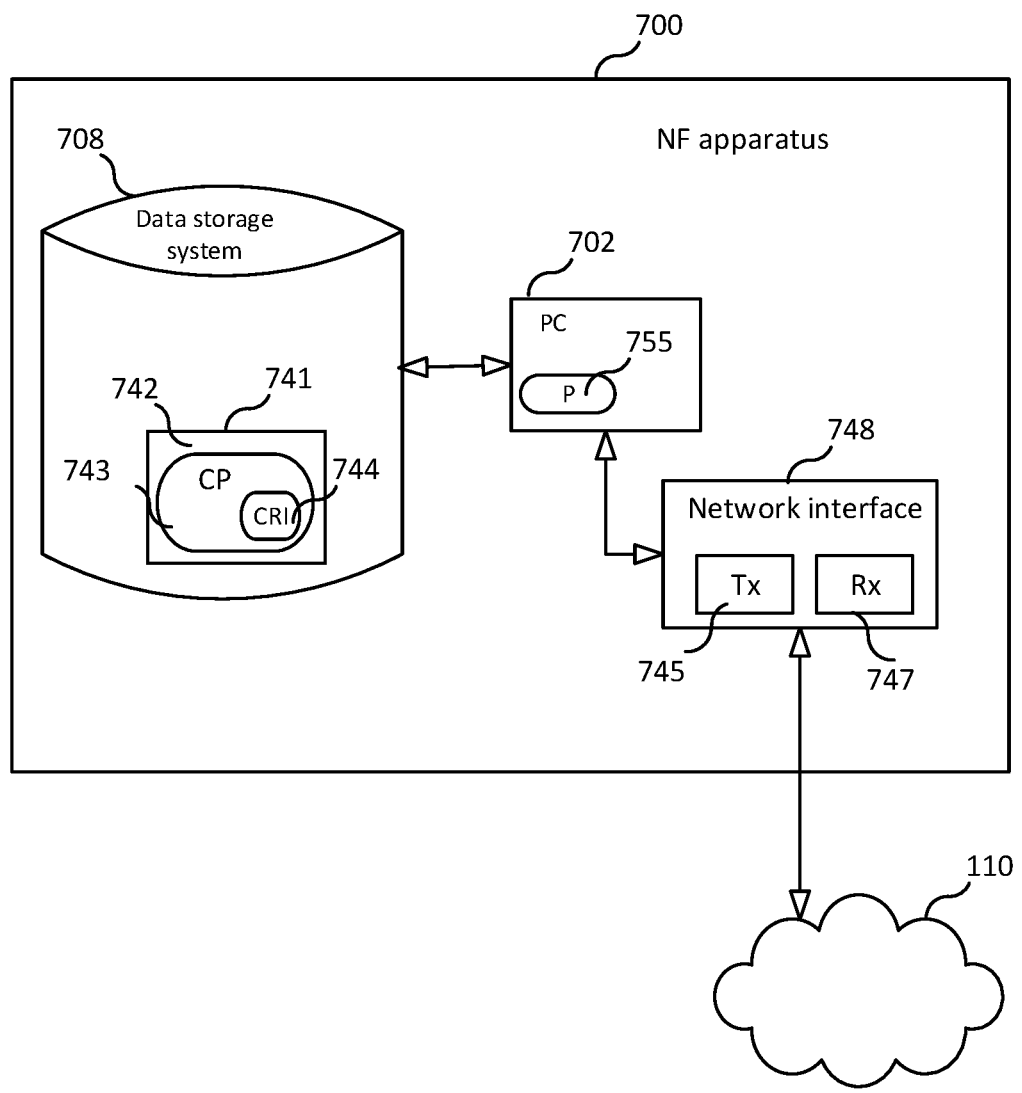
FIG. 7 is a block diagram of an apparatus according to an embodiment.

In embodiments in which NE 504 or NRE 502 are implemented in software, FIG. 7 is a block diagram of a physical machine (or "apparatus") 700, according to some embodiments, which can be used to run NE 504 and/or NRE 502. For instance, apparatus 700 may run a virtual machine that runs NE 504 or NRE 502. As shown in FIG. 7, apparatus 700 may comprise: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 700 may be a distributed computing apparatus); a network interface 748 comprising a transmitter (Tx) 745 and a receiver (Rx) 747 for enabling apparatus 700 to transmit data to and receive data from other machines connected to a network 110 (e.g., an Internet Protocol (IP) network) to which network interface 748 is connected (directly or indirectly) (e.g., network interface 748 may be wirelessly connected to the network 110, in which case network interface 748 is connected to an antenna arrangement); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes apparatus 700 to perform steps described herein (e.g., steps described herein with reference to the flow charts). In other embodiments, apparatus 700 may be configured to perform steps described herein without the need for code. That is, for example, PC 702 may consist merely of one or more ASICs. Hence, the features of the embodiments described herein may be implemented in hardware and/or software.

Figure 8A:
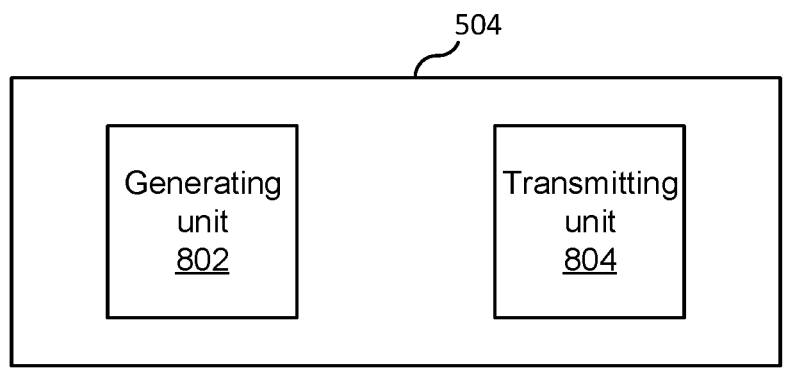
FIG. 8A is a block diagram of an NE according to an embodiment.
Figure 8B:
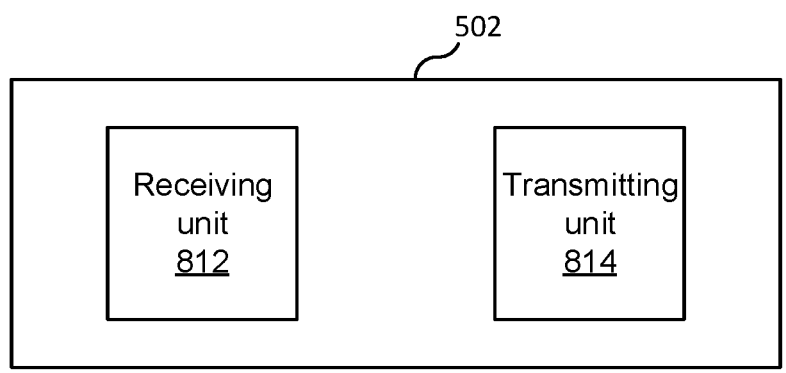
FIG. 8B is a block diagram of an NRE according to an embodiment.

FIG. 8A is a block diagram of NE 504 according to some embodiments. As shown in FIG. 8, in this embodiment NE 504 includes: a generating unit 802 for generating discovery request 501 and a transmitting unit 904 for employing a transmitter to transmit the discovery request 501 to NRE 502. FIG. 8B is a block diagram of NRE 502 according to some embodiments. As shown in FIG. 9, in this embodiment NRE 502 includes: a receiving unit 812 for employing a receiver to receive discovery request 501 and a transmitting unit 814 for employing a transmitter to transmit the discovery response 503 to NE 504.

SOME EMBODIMENTS

Some Embodiments that are Described Above May be Summarized in the Following Manner:

1. A method (400), the method comprising:

a network entity (504) (e.g., an NF instance) generating (s402) a discovery request (501), wherein the discovery request (501) comprises a set of query parameters, the set of query parameters comprising a set of candidate network entity identifiers, IDs, comprising at least a first candidate network entity ID (e.g., an I-SMF instance ID or other NF instance ID), wherein each candidate network entity ID included in the set of candidate network entity IDs identifies a candidate network entity; and the network entity transmitting (s404) the discovery request to a network repository entity, NRE, (502) (e.g., an instance of an NRF).

2. The method of embodiment 1, wherein the set of query parameters further comprises filter criteria for use by the NRE to determine network entities that satisfy the filter criteria, and the set of candidate network entity IDs is not a part of the filter criteria.

3. The method of embodiment 2, further comprising receiving (s406) from the NRE a response to the query, which response comprises an array of network entity profiles, wherein a network entity profile corresponding to the first candidate network entity ID is placed in a beginning portion of the array of profiles as a result of the first candidate entity ID i) identifying a network entity that satisfies the filter criteria and ii) being included in the set of N candidate network entity IDs.

4. The method of embodiment 3, further comprising receiving from the NRE a response to the query, wherein the set of candidate network entities IDs consists of N number of candidate network entity IDs, N is greater than or equal to 1, the response to the discovery request comprises an array of M number of network entity profiles, M is greater than N, and the network entity profile corresponding to the first candidate network entity ID is placed in one of the first N positions of the array of network entity profiles.

5. The method of embodiment 2, further comprising receiving from the NRE a response to the query, wherein the response comprises an array of network entity profiles, and the array of network entity profiles comprises a first network entity profile that corresponds to the first candidate network entity ID regardless of whether or not the first network entity profile satisfies the filter criteria.

6. The method of embodiment 5, wherein the set of candidate network entities IDs consists of N number of candidate network entity IDs, N is greater than or equal to 1;

the array of network entity profiles comprises M number of network entity profiles, M is greater than N, and the first network entity profile, which corresponds to the first candidate network entity ID, is included in one of the first N positions of the array of network entity profiles regardless of whether or not the first network entity profile satisfies the filter criteria.

7. The method of any one of embodiments 2-6, wherein the set of query parameters further includes an inclusion indicator value that indicates whether or not a network entity profile corresponding to the first candidate network entity ID should be included in an array of query results even if the first candidate network entity ID does not identify a network entity that satisfies the filter criteria.

8. The method of any one of embodiments 2-6, wherein the set of query parameters includes an array of tuples, each of the tuples included in the array consists of: i) one of the candidate network entity IDs and ii) and a value indicating whether or not the network entity profile corresponding to the candidate network entity ID included in the tuple should be included in an array of query results even if the candidate network entity ID does not identify a network entity that satisfies the filter criteria.

9. The method of any one of embodiments 1-8, further comprising network entity (504) receiving from another network entity (506) user equipment, UE, context information for a UE that has initiated a registration procedure and that has a protocol data unit, PDU, session, wherein the UE context information comprises PDU context information associated with the PDU session, and the PDU context information comprises a first Session Management Function, SMF, ID identifying an anchor SMF for the PDU session and a second SMF ID identifying an intermediate SMF, I-SMF, for the PDU session.

10. The method of any one of embodiments 1-9, wherein the network entity is an instance of an Access and Mobility Management Function.

11. A method (600), the method comprising:

a network repository entity, NRE, (502) receiving (s602) a discovery request transmitted by a network entity (504) (e.g., AMF), wherein the received discovery request comprises a set of query parameters, the set of query parameters comprising a set of candidate network entity identifiers, IDs, comprising at least a first candidate network entity ID, wherein each candidate network entity ID included in the set of candidate network entity IDs identifies a candidate network entity; and the NRE transmitting (s604) to the network entity a discovery response responding to the discovery request.

12. The method of embodiment 11, wherein the set of query parameters further comprises filter criteria for use by the NRE to determine network entities that satisfy the filter criteria, and the set of candidate network entity IDs is not a part of the filter criteria.

13. The method of embodiment 12, wherein
the set of candidate network entities IDs consists of N number of candidate network entity IDs,
N is greater than or equal to 1,
the discovery response comprises an array of M number of network entity profiles,
M is greater than N, and
the method further comprises the NRE generating the discovery response, wherein generating the discovery response comprises:
the NRE determining that the first candidate network entity ID i) identifies a network entity that satisfies the filter criteria and ii) is included in the set of N candidate network entity IDs; and
as a result of determining that the first candidate network entity ID i) identifies a network entity that satisfies the filter criteria and ii) is included in the set of N candidate network entity IDs, the NRE generates the array of M network entity profiles such that the network entity profile corresponding to the first candidate network entity ID is located in one of the first N positions of the array of M network entity profiles.

14. The method of embodiment 12, wherein
the set of candidate network entities IDs consists of N number of candidate network entity IDs,
N is greater than or equal to 1,
the discovery response comprises an array of network entity profiles, and
the method further comprises the NRE generating the discovery response, wherein generating the discovery response comprises:
the NRE determining that the first candidate network entity ID is included in the set of N candidate network entity IDs; and
as a result of determining that the first candidate network entity ID is included in the set of N candidate network entity IDs, the NRE generates the array of network entity profiles such that the network entity profile corresponding to the first candidate network entity ID (i.e. the profile of the instance identified by the first candidate network entity ID) is located in one of the first N positions of the array of network entity profiles.

15. The method of any one of embodiments 12-14, wherein the set of query parameters further includes an inclusion indicator value that indicates whether or not a network entity profile corresponding to the first candidate network entity ID should be included in an array of query results even if the first candidate network entity ID does not identify a network entity that satisfies the filter criteria.

16. The method of any one of embodiments 12-14, wherein
the set of query parameters includes an array of tuples,
each of the tuples included in the array consists of: i) one of the candidate network entity IDs and ii) and a value indicating whether or not the network entity profile corresponding to the candidate network entity ID included in the tuple should be included in an array of query results even if the candidate network entity ID does not identify a network entity that satisfies the filter criteria.

17. The method of any one of embodiments 11-16, wherein
the discovery response comprises a data object that contains each said candidate network entity ID, and, for each said candidate network entity ID, the data object further comprises a matchFilter indicator corresponding to the candidate network entity ID, and each matchFilter indicator indicates whether or not the network entity profile of the candidate network entity identified by the corresponding candidate network entity ID satisfies the filter criteria.

18. A computer program (743) comprising instructions (744) which when executed by processing circuitry (702) of an apparatus (700) causes the apparatus (700) to perform the method (400, 600) of any one of the above embodiments.

19. A carrier containing the computer program of embodiment 18, wherein the carrier is one of an electronic signal, an optical signal, a radio signal, and a computer readable storage medium (742).

20. An apparatus (700), the apparatus being adapted to:
generate an discovery request (501), wherein the discovery request (501) comprises a set of query parameters, the set of query parameters comprising a set of candidate network entity identifiers, IDs, comprising at least a first candidate network entity ID (e.g., an I-SMF instance ID), wherein each candidate network entity ID included in the set of candidate network entity IDs identifies a candidate network entity; and
employ a transmitter (745) to transmit the discovery request to a network repository entity, NRE, (502).

21. An apparatus (700), the apparatus being adapted to:
employ a receiver (747) to receive a discovery request (501) transmitted by a network entity, NE, (e.g., an instance of an AMF), wherein the received discovery request comprises a set of query parameters, the set of query parameters comprising a set of candidate network entity identifiers, IDs, comprising at least a first candidate network entity ID, wherein each candidate network entity ID included in the set of candidate network entity IDs identifies a candidate network entity; and
employ a transmitter (745) to transmit to the network entity a discovery response responding to the discovery request.

22. A network entity, NE, (504), the network entity comprising:
a generating unit (802) configured to generate an discovery request (501), wherein the discovery request (501) comprises a set of query parameters, the set of query parameters comprising a set of candidate network entity identifiers, IDs, comprising at least a first candidate network entity ID (e.g., an I-SMF instance ID), wherein each candidate network entity ID included in the set of candidate network entity IDs identifies a candidate network entity; and
a transmitting unit (804) configured to employ a transmitter (745) to transmit the discovery request to a network repository entity, NRE, (502).

23. A network repository entity, NRE, (502), the NRE comprising:
a receiving unit (812) configured to employ a receiver (747) to receive a discovery request (501) transmitted by a network entity, NE, wherein the received discovery request comprises a set of query parameters, the set of query parameters comprising a set of candidate network entity identifiers, IDs, comprising at least a first candidate network entity ID, wherein each candidate network entity ID included in the set of candidate network entity IDs identifies a candidate network entity; and
a transmitting unit (814) configured to employ a transmitter (745) to transmit to the network entity a discovery response responding to the discovery request.

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. The indefinite article "a" should be interpreted openly as meaning "at least one" unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is inherent that a step must follow or precede another step.

The invention claimed is:

1. A method performed by a network entity, the method comprising:
   the network entity generating a discovery request, wherein the discovery request comprises a set of query parameters, the set of query parameters comprising a first candidate network entity identifier (ID) that identifies a first candidate network entity and a set of search parameters for use by a network repository entity (NRE) to determine network entities that match one or more of the search parameters, where the first candidate network entity ID is not one of the search parameters and the set of search parameters comprises a first search parameter;
   the network entity transmitting the discovery request to the NRE; and
   the network entity receiving from the NRE a discovery response responsive to the discovery request, wherein the discovery response comprises a SearchResult data object that comprises: i) a first information element comprising an array of one or more network function (NF) profiles, wherein each NF profile in the array matches at least one of the search parameters and ii) a second information element comprising a match indicator information element comprising a Boolean indicator that indicates whether or not at least one of the one or more NF profiles in the array matches the first search parameter.

2. The method of claim 1, wherein
   the set of query parameters further comprises a second candidate network entity ID, and
   the second candidate network entity ID is not one of the search parameters.

3. The method of claim 2, wherein
   the first candidate network entity ID identifies a first session management function (SMF).

4. The method of claim 3, wherein
   the second candidate network entity ID identifies a second SMF.

5. The method of claim 4, wherein the second SMF is an intermediate SMF (I-SMF).

6. The method of claim 1, wherein the set of query parameters further includes an inclusion indicator value that indicates whether or not a network entity profile corresponding to the first candidate network entity ID should be included in an array of query results even if the first candidate network entity ID does not identify a network entity that matches the search parameters.

7. The method of claim 1, wherein
   the set of query parameters includes an array of tuples,
   each of the tuples included in the array consists of: i) one of the candidate network entity IDs and ii) and a value indicating whether or not the network entity profile corresponding to the candidate network entity ID included in the tuple should be included in an array of query results even if the candidate network entity ID does not identify a network entity that matches the search parameters.

8. The method of claim 1, further comprising network entity receiving from another network entity user equipment (UE) context information for a UE that has initiated a registration procedure and that has a protocol data unit (PDU) session, wherein
   the UE context information comprises PDU context information associated with the PDU session, and
   the PDU context information comprises a first Session Management Function, SMF, ID identifying an anchor SMF for the PDU session and a second SMF ID identifying an intermediate SMF (I-SMF) for the PDU session.

9. The method of claim 1, wherein the network entity is an instance of an Access and Mobility Management Function.

10. A method performed by a network repository entity (NRE), the method comprising:
    the NRE receiving a discovery request transmitted by a network entity, wherein the received discovery request comprises a set of query parameters, the set of query parameters comprising a first candidate network entity identifier (ID) that identifies a first candidate network entity and a set of search parameters for use by a network repository entity (NRE) to determine network entities that match one or more of the search parameters, where the first candidate network entity ID is not one of the search parameters and the set of search parameters comprises a first search parameter; and
    the NRE transmitting to the network entity a discovery response responding to the discovery request, wherein the discovery response comprises a SearchResult data object that comprises: i) a first information element comprising an array of one or more network function (NF) profiles, wherein each NF profile in the array matches at least one of the search parameters and ii) a second information element comprising a match indicator information element comprising a Boolean indicator that indicates whether or not at least one of the one or more NF profiles in the array matches the first search parameter.

11. The method of claim 10, wherein
    the set of query parameters further comprises a second candidate network entity ID, and
    the second candidate network entity ID is not one of the search parameters.

12. The method of claim 11, wherein
    the first candidate network entity ID identifies a first session management function (SMF), and
    the second candidate network entity ID identifies an intermediate SMF (I-SMF).

13. The method of claim 10, wherein the set of query parameters further includes an inclusion indicator value that indicates whether or not a network entity profile corresponding to the first candidate network entity ID should be included in an array of query results even if the first candidate network entity ID does not identify a network entity that matches the search parameters.

14. The method of claim 10, wherein
the set of query parameters includes an array of tuples,
each of the tuples included in the array consists of: i) one of the candidate network entity IDs and ii) and a value indicating whether or not the network entity profile corresponding to the candidate network entity ID included in the tuple should be included in an array of query results even if the candidate network entity ID does not identify a network entity that matches the search parameters.

15. A non-transitory computer readable medium storing a computer program comprising instructions which when executed by processing circuitry of an apparatus causes the apparatus to perform the method of claim 1.

16. A non-transitory computer readable medium storing a computer program comprising instructions which when executed by processing circuitry of an apparatus causes the apparatus to perform the method of claim 10.

17. A network entity (NE), the network entity comprising:
processing circuitry configured to generate a discovery request, wherein the discovery request comprises a set of query parameters, the set of query parameters comprising a first candidate network entity identifier (ID) that identifies a first candidate network entity and a set of search parameters for use by a network repository entity (NRE) to determine network entities that match one or more of the search parameters, where the first candidate network entity ID is not one of the search parameters and the set of search parameters comprises a first search parameter;
a transmitter for transmitting the discovery request to the NRE; and
a receiver for receiving a response to the discovery request, wherein the response to the discovery request comprises a SearchResult data object that comprises: i) a first information element comprising an array of one or more network function (NF) profiles, wherein each NF profile in the array matches at least one of the search parameters and ii) a second information element comprising a match indicator information element comprising a Boolean indicator that indicates whether or not at least one of the one or more NF profiles in the array matches the first search parameter.

18. A network repository entity (NRE), the NRE comprising:
a receiver for receiving a discovery request transmitted by a network entity (NE), wherein the received discovery request comprises a set of query parameters, the set of query parameters comprising a first candidate network entity identifier (ID) that identifies a first candidate network entity and a set of search parameters for use by a network repository entity (NRE) to determine network entities that match one or more of the search parameters, where the first candidate network entity ID is not one of the search parameters and the set of search parameters comprises a first search parameter; and
a transmitter for transmitting a discovery response responding to the discovery request wherein the discovery response comprises a SearchResult data object that comprises: i) a first information element comprising an array of one or more network function (NF) profiles, wherein each NF profile in the array matches at least one of the search parameters and ii) a second information element comprising a match indicator information element comprising a Boolean indicator that indicates whether or not at least one of the one or more NF profiles in the array matches the first search parameter.

\* \* \* \* \*

UNITED STATES PATENT AND TRADEMARK OFFICE
CERTIFICATE OF CORRECTION

| | | |
|---|---|---|
| PATENT NO. | : 12,015,679 B2 | Page 1 of 1 |
| APPLICATION NO. | : 17/636798 | |
| DATED | : June 18, 2024 | |
| INVENTOR(S) | : Yang et al. | |

It is certified that error appears in the above-identified patent and that said Letters Patent is hereby corrected as shown below:

In the Specification

In Column 4, Line 57, delete "pcfld, smsfld," and insert -- pcfId, smsfId, --, therefor.

In Column 4, Line 58, delete "vsmfld." and insert -- vsmfId. --, therefor.

In Columns 19 & 20, in "TABLE 5", under "Description", Line 13, delete "EBls" and insert -- EBIs --, therefor.

In Column 20, Line 45, delete "current" and insert -- currently --, therefor.

In Column 20, Line 59, delete "current" and insert -- currently --, therefor.

In Column 20, Line 64, delete "current" and insert -- currently --, therefor.

In the Claims

In Column 28, Line 11, in Claim 7, delete "and ii) and" and insert -- and ii) --, therefor.

In Column 29, Line 11, in Claim 14, delete "and ii) and" and insert -- and ii) --, therefor.

Signed and Sealed this
Twenty-second Day of October, 2024

*Katherine Kelly Vidal*
Katherine Kelly Vidal
*Director of the United States Patent and Trademark Office*